United States Patent
Lammich

(10) Patent No.: US 12,194,820 B2
(45) Date of Patent: Jan. 14, 2025

(54) ACCESS CONTROL METHOD FOR A MOTOR VEHICLE AND ACCESS CONTROL SYSTEM

(71) Applicant: U-Shin Deutschland Zugangssysteme GmbH, Erdweg (DE)

(72) Inventor: Marc-Tell Lammich, Erdweg (DE)

(73) Assignee: U-Shin Deutschland Zugangssysteme GmbH, Erdweg (DE)

( * ) Notice: Subject to any disclaimer, the term of this patent is extended or adjusted under 35 U.S.C. 154(b) by 963 days.

(21) Appl. No.: 17/118,925

(22) Filed: Dec. 11, 2020

(65) Prior Publication Data

US 2021/0188059 A1 Jun. 24, 2021

(30) Foreign Application Priority Data

Dec. 19, 2019 (DE) .......................... 102019135130.8

(51) Int. Cl.
  *B60J 5/04* (2006.01)
  *B60W 50/00* (2006.01)
  *G07C 9/00* (2020.01)

(52) U.S. Cl.
  CPC ............. *B60J 5/047* (2013.01); *B60J 5/0468* (2013.01); *B60W 50/00* (2013.01); *G07C 9/00309* (2013.01); *B60W 2050/0028* (2013.01)

(58) Field of Classification Search
  None
  See application file for complete search history.

(56) References Cited

U.S. PATENT DOCUMENTS

| | | |
|---|---|---|
| 5,929,769 A | 7/1999 | Garnault |
| 6,198,996 B1 | 3/2001 | Berstis |
| 8,335,599 B2 | 12/2012 | Dickerhoof et al. |
| 9,775,100 B1 | 9/2017 | Smereka et al. |

(Continued)

FOREIGN PATENT DOCUMENTS

| | | |
|---|---|---|
| CN | 1951026 B | 6/2010 |
| CN | 102419431 A | 4/2012 |

(Continued)

OTHER PUBLICATIONS

Machine translation of Zammert et al DE 102014115250 (Year: 2023).*

*Primary Examiner* — Aniss Chad
*Assistant Examiner* — Jennifer M Anda
(74) *Attorney, Agent, or Firm* — DLA PIPER LLP (US)

(57) ABSTRACT

The invention relates to an access control method for a motor vehicle. The motor vehicle has at least a first and a second access element automatically adjustable between a closed position and an open position. The method comprises at least the following steps: detecting at least one position of a key element carried by a user relative to the motor vehicle by radio; calculating a probability of use for each access element depending on the at least one detected position of the key element; adjusting both the first access element and the second access element from the closed position to the open position if: the probability of use of each of the first and second access elements is above a predetermined first threshold value; and an absolute value of a difference in the probability of use of the first and second access elements is below a predetermined second threshold value.

14 Claims, 1 Drawing Sheet

(56) References Cited

U.S. PATENT DOCUMENTS

| | | | |
|---|---|---|---|
| 9,873,396 | B2 | 1/2018 | Lem et al. |
| 9,972,150 | B2 | 5/2018 | Da Deppo et al. |
| 10,101,433 | B2 | 10/2018 | Laifenfeld et al. |
| 10,123,297 | B1 | 11/2018 | Harney et al. |
| 10,328,900 | B1 | 6/2019 | Yakovenko et al. |
| 10,415,528 | B2 | 9/2019 | Chaplow et al. |
| 2002/0084887 | A1 | 7/2002 | Arshad et al. |
| 2002/0118579 | A1 | 8/2002 | Lucy et al. |
| 2004/0021550 | A1 | 2/2004 | Ohtaki et al. |
| 2010/0075656 | A1 | 3/2010 | Howarter et al. |
| 2010/0305779 | A1 | 12/2010 | Hassan et al. |
| 2011/0316669 | A1 | 12/2011 | McBride et al. |
| 2013/0030645 | A1 | 1/2013 | Divine et al. |
| 2014/0285319 | A1* | 9/2014 | Khan ................. G07C 9/00 340/5.61 |
| 2015/0070135 | A1 | 3/2015 | Ford |
| 2015/0102898 | A1* | 4/2015 | Huennekens ......... B60R 25/24 340/5.6 |
| 2015/0120151 | A1 | 4/2015 | Akay et al. |
| 2015/0149042 | A1* | 5/2015 | Cooper ............... B60R 25/245 701/48 |
| 2015/0363988 | A1 | 12/2015 | Van Wiemeersch et al. |
| 2016/0159321 | A1 | 6/2016 | Lagabe |
| 2016/0272154 | A1 | 9/2016 | Sanji et al. |
| 2016/0320469 | A1 | 11/2016 | Laifenfeld et al. |
| 2017/0074000 | A1* | 3/2017 | Banvait ............ G07C 9/00571 |
| 2017/0318612 | A1 | 11/2017 | Gu et al. |
| 2018/0002972 | A1* | 1/2018 | Myers .................. E05B 81/78 |
| 2018/0053416 | A1 | 2/2018 | Sanji et al. |
| 2018/0068510 | A1 | 3/2018 | Atsumi |
| 2019/0003439 | A1 | 1/2019 | Chaplow et al. |
| 2019/0126843 | A1 | 5/2019 | Bouchard et al. |
| 2019/0130682 | A1 | 5/2019 | Farges |
| 2019/0248331 | A1 | 8/2019 | Salah et al. |
| 2019/0300006 | A1 | 10/2019 | Golsch |
| 2019/0304224 | A1* | 10/2019 | Golsch ................. H04W 76/14 |
| 2019/0393618 | A1 | 12/2019 | Guthrie et al. |
| 2020/0169842 | A1 | 5/2020 | Yamaguchi |
| 2020/0196094 | A1 | 6/2020 | Smith |
| 2020/0196095 | A1 | 6/2020 | Smith et al. |
| 2020/0297059 | A1 | 9/2020 | Viner et al. |
| 2020/0384952 | A1 | 12/2020 | Lammich |
| 2021/0046888 | A1 | 2/2021 | Vardharajan |
| 2021/0046899 | A1* | 2/2021 | Uttam .................. H04W 4/021 |
| 2021/0074093 | A1 | 3/2021 | Love et al. |
| 2021/0188212 | A1 | 6/2021 | Lammich |
| 2021/0270956 | A1 | 9/2021 | Yoshida et al. |

FOREIGN PATENT DOCUMENTS

| | | | | |
|---|---|---|---|---|
| CN | 102602363 | A | 7/2012 | |
| CN | 102611471 | A | 7/2012 | |
| CN | 102001424 | B | 12/2012 | |
| CN | 103946899 | A | 7/2014 | |
| CN | 103963742 | A | 8/2014 | |
| CN | 105093171 | A | 11/2015 | |
| CN | 107128282 | | 9/2017 | |
| CN | 107685711 | A | 2/2018 | |
| CN | 108307294 | A | 7/2018 | |
| CN | 109218972 | A | 1/2019 | |
| CN | 107963059 | B | 3/2020 | |
| CN | 107454552 | B | 1/2021 | |
| CN | 109466506 | B | 6/2021 | |
| CN | 110239485 | B | 11/2021 | |
| DE | 69913607 | T2 | 9/2004 | |
| DE | 102007002700 | A1 | 7/2008 | |
| DE | 102007010583 | A1 | 9/2008 | |
| DE | 10306610 | C5 | 12/2008 | |
| DE | 102010010057 | A1 | 9/2011 | |
| DE | 102011103406 | | 12/2012 | |
| DE | 102013112120 | A1 | 5/2015 | |
| DE | 102015106680 | A1 | 11/2015 | |
| DE | 102014010343 | A1 | 1/2016 | |
| DE | 102014115250 | A1 * | 4/2016 | ............. B60R 25/24 |
| DE | 102016108725 | A1 | 11/2016 | |
| DE | 102015214793 | | 2/2017 | |
| DE | 102016115754 | A1 | 3/2017 | |
| DE | 102017200257 | | 7/2017 | |
| DE | 102017105629 | A1 | 9/2017 | |
| DE | 102017213814 | | 2/2019 | |
| FR | 2934223 | A3 | 1/2010 | |
| GB | 2572584 | | 10/2019 | |
| JP | 2004183625 | A | 7/2004 | |
| JP | 2004232558 | A | 8/2004 | |
| JP | 2005139656 | | 6/2005 | |
| JP | 2005315024 | A | 11/2005 | |
| JP | 2006009650 | A | 1/2006 | |
| JP | 2006298169 | | 11/2006 | |
| JP | 2007063893 | | 3/2007 | |
| JP | 2007238025 | | 9/2007 | |
| JP | 2008285885 | | 11/2008 | |
| JP | 2008285946 | A | 11/2008 | |
| JP | 2009029376 | A | 2/2009 | |
| JP | 2009046837 | A | 3/2009 | |
| JP | 2009286343 | A | 12/2009 | |
| JP | 2010146095 | A | 7/2010 | |
| JP | 2010157794 | A | 7/2010 | |
| JP | 2011144624 | A | 7/2011 | |
| JP | 2011184918 | A | 9/2011 | |
| JP | 2012007971 | A | 1/2012 | |
| JP | 2012172367 | A | 9/2012 | |
| JP | 2015045183 | A | 3/2015 | |
| JP | 2015063827 | A | 4/2015 | |
| JP | 2015085899 | A | 5/2015 | |
| JP | 2015151792 | A | 8/2015 | |
| JP | 2015209715 | A | 11/2015 | |
| JP | 2016014259 | A | 1/2016 | |
| JP | 2016030919 | A | 3/2016 | |
| JP | 2016183489 | A | 10/2016 | |
| JP | 2016188499 | A | 11/2016 | |
| JP | 2018034635 | A | 3/2018 | |
| JP | 2018062808 | | 4/2018 | |
| JP | 2018141771 | A | 9/2018 | |
| JP | 2018145615 | A | 9/2018 | |
| JP | 2018178506 | A | 11/2018 | |
| JP | 2019032169 | A | 2/2019 | |
| KR | 20150011032 | A | 1/2015 | |
| WO | 2016/194997 | | 12/2016 | |
| WO | 2017/136725 | | 8/2017 | |
| WO | 2019048266 | A1 | 3/2019 | |
| WO | 2019097051 | A1 | 5/2019 | |

* cited by examiner

ACCESS CONTROL METHOD FOR A MOTOR VEHICLE AND ACCESS CONTROL SYSTEM

CROSS-REFERENCE TO RELATED APPLICATIONS

This application claims priority to German Application Serial No. 102019135130.8, filed Dec. 19, 2019, the content of which is incorporated herein by reference in its entirety.

TECHNICAL FIELD

The present invention relates to a method for access control in a motor vehicle. Furthermore, the present invention relates to an access control system.

BACKGROUND

For reasons of comfort, modern motor vehicles are increasingly equipped with automatically opening door systems. For this purpose, an owner receives a portable key element whose position can be detected by the vehicle. In response to certain detected positions, a door can then be unlocked and/or opened automatically by the vehicle. Thus, a carrier of the key element does not have to take it into his hands and/or operate it, for example by pressing a button, before access to the vehicle can be gained. This makes access to the motor vehicle particularly convenient.

FR 2934223 describes a predictive access control for a motor vehicle. In this predictive access control, not only is the position of a transponder for controlling a door opening taken into account, but a motion pathway of this transponder is, as well.

A prediction enables a particularly early door opening, which can further increase comfort. However, in principle, a prediction can be erroneous. Thus, a door of the vehicle can undesirably be opened, which then should not be used or is not used at all. At the same time, another door of the vehicle, which a user wants to use, can remain closed. This can lead to uncomfortable situations for respective users of the vehicle.

DESCRIPTION OF THE INVENTION

The object of the present disclosure is to improve the comfort of an access control system for motor vehicles, in which the respective access elements are automatically opened.

This task is solved by the subject matter of the independent patent claims. Advantageous embodiments and expedient developments of the invention are indicated in the respective dependent claims.

A first aspect of the present disclosure relates to a method for access control of a motor vehicle. The motor vehicle can comprise at least a first and a second access element automatically adjustable between a closed position and an open position, wherein, for example, one or all of the access elements can be configured as a door. However, one of the access elements can also be configured as a trunk lid or tailgate. The method may comprise the step of detecting at least one position of a key element carried by a user relative to the motor vehicle by radio. For example, for this purpose, a radio signal can be triangulated. A position relative to the motor vehicle can be a distance and an angle in a horizontal plane relative to a point in the motor vehicle. This point can be regarded as an origin of a motor vehicle coordinate system. Accordingly, a position in an interior of the motor vehicle can also be understood as a position relative to the motor vehicle. Preferably, positions outside an interior space are considered. The method may comprise the step of calculating a probability of use for each access element depending on the at least one detected position of the key element. A probability of use can be a result of a prediction, so the calculation of the probability of use can be a prediction. The probability of use can be calculated as a value between 0% and 100%. The probability of use can be a probability that the user will use the access element or the access opening assigned to the access element, especially to enter into an interior of the motor vehicle. The calculation can be done, for example, by extrapolating a motion path, based on a distance of the key element to a respective access element and/or by comparing tabular values in a database. The probability of use can be a value for a prognosis which of the access elements the carrier of the key element intends to use. The probabilities of use each can be calculated depending on the detected position of the key element. Also, a plurality of consecutive detected positions can be considered and, depending on the respective detected positions, certain values, such as a motion path, a direction of movement and/or a speed of movement can be taken into account. A simple example of a prediction is an extrapolation of the current motion and checking whether it intersects or respectively points to one of the access elements. The probability of use can be higher, the more precisely the motion path points to the access element or respectively the smaller the deviation from a current motion path needs to be to actually reach the access element. Also, the distance of the key element to the respective access elements can have an influence on the calculation of the respective probabilities of use.

The method may comprise the step of adjusting both the first access element and the second access element from the closed position to the open position. This adjustment can be automatic and/or self-acting without the user having to operate a switch. The adjustment may, for example, include pivoting, in particular of a door about a vertical pivot axis. The adjustment can also comprise unlocking or respectively locking of an associated lock. In the closed position, a corresponding access opening to an interior of the motor vehicle may be at least partially or completely blocked by the respective access element. In the open position, the corresponding access opening to the interior of the motor vehicle may be at least partially unblocked, in particular at least to such an extent that access to the interior is possible for the user. Preferably, the respective access opening is unblocked by a respective access element in the open position to such an extent that a person can enter the interior of the motor vehicle or use the trunk. The adjustment of the respective access elements can, for example, be carried out by means of an actuator installed in the vehicle, which cooperates with one or more access elements. For example, an electric motor can be provided per vehicle door, by means of which the associated vehicle door can be pivoted between its respective positions and/or unlocked.

The adjustment from the closed position to the open position occurs preferably only if the respective probability of use of the first and second access element is above a predetermined first threshold value. The first threshold value can be, for example, a minimum probability of use at which opening an access by adjusting the access element seems reasonable. Thus, if a use seems sufficiently probable for both accesses, both accesses are automatically unblocked. Preferably, however, adjustment only occurs if the absolute value of difference between the probability of use of the first and second access element is below a predetermined second threshold value. The predetermined second threshold value can, for example, correspond to a calculation accuracy of the respective probabilities of use. This can be determined, for example, by experiments. The method is such that both access elements should be opened if a use is sufficiently probable and if it cannot be determined with sufficient certainty which of the two access elements is more likely to be used. By opening both access elements, it can be avoided that the access element which the user actually wants to use is still in its closed position. If the difference in the probability of use does not seem significant enough, both access elements are opened to avoid an uncomfortable situation for the user. The method thus can compensate to a certain degree that calculated probabilities of use or respective prognoses are inherently subject to uncertainty. This compensation is especially useful in borderline situations where it is not feasible to distinguish with sufficient certainty which access element is likely to be used.

The vehicle may also have more than two respective access elements that are automatically adjustable between a closed position and an open position. The method can also be applied accordingly for three or more access elements. Correspondingly, all access elements can be opened for which a use seems sufficiently probable and a decision to open only a certain one of these access elements is not reasonably possible due to too small respective differences in the probability of use. The respective access elements in open position can also be called open access elements and respective access elements in closed position can be called closed access elements. Correspondingly, an adjustment in the open position can be called opening and an adjustment into the closed position can be called closing.

The detection of the position of the key element can be done, for example, by triangulation with several transmitters and/or receivers on the vehicle. Several radio signals on different frequencies can also be used for the detection. For example, a radio signal with low energy consumption and long range can first be emitted from the key element and/or the motor vehicle. As soon as the key element is within range of a radio link, a transmission is then activated on a frequency that enables particularly accurate positioning. Each radio signal may be encrypted and/or have a unique identifier to reduce the risk of unauthorized access and/or to ensure the key element is authorized to gain access to the vehicle.

A portable key element can be a device that can be carried by a user or carrier. A carried key element does not necessarily mean that the key element is held. The key element can be considered carried if it moves with the user or carrier, especially when the user or carrier is walking. For example, the key element may also be carried in a handbag, carried in a trouser pocket, worn as a garment and/or also may be implanted in the user.

The procedure can also be performed for several different key elements, especially simultaneously. For example, a position of a first key element and a position of a second key element can be detected and, depending on these, probabilities of use can be calculated for the usage of respective access elements. The adjustment of the respective access elements into the open position can only be done, for example, if one of the respective key elements has gone below a minimum distance to the motor vehicle.

In another advantageous embodiment of the method, it is provided that several consecutive positions of the key element are detected, and the several consecutive positions of the key element are taken into account when calculating the probabilities of use. By detecting several consecutive positions, the calculation accuracy of the probabilities of use can be improved, which can also be called prognosis accuracy. Consecutive can be understood as spatial and/or temporal. In particular, such a detection not only allows to consider the current position of the key element relative to the vehicle, but also previous positions, a movement speed, a movement direction, a movement pattern and/or a previous motion path. The determination and/or use of this data or values for the prognosis can further improve its accuracy.

In a further advantageous embodiment of the method it is provided that for each access element a first probability of use and at least one subsequent second probability of use is calculated. The first probability of use can correspond to a result of the calculation at a first point in time and the second probability of use can correspond to a result of the calculation at a later second point in time. The respective points in time can be based on different positions, motion sequences and the like, whereby the respective probabilities of use can be different. Thus, it is possible to take into account a changed behavior of the carrier of the key element. The prognosis can thus be adjusted continuously or intermittently to the most recent position data. A time interval between the first probability of use and the second probability of use can correspond, for example, to a sampling rate of the detection and/or a calculation duration for the probabilities of use. It is also possible to calculate further probabilities of use for each access element, for example a third probability of use following the second usage probability.

In a further advantageous embodiment of the method it is provided that an adjustment of the first access element from its closed position to the open position is made and the second access element remains in the closed position. Preferably this adjustment is carried out if the probability of use of the first and the second access element is above a predetermined first threshold value and the probability of use of the first access element is higher than the probability of use of the second access element by a predetermined third threshold value. In this case the probability of use of the first access element can be so much higher that there is no risk of loss of comfort when opening only the first access element, although for each access element the probability of use itself is so high that opening it seems to make sense. The third threshold value can correspond to the second threshold value in order to allow a simple control with low computational effort. However, the third threshold value can also be unequal to the second threshold value in order to implement a hysteresis during opening and closing and to avoid undesired high-frequency adjustment of the respective access elements, especially if first and second probabilities of use are considered and adjustment adapted to the most recent prediction is made. The adjustment of only the first access element from its closed position to the open position while the second access element remains in the closed position, if the probability of use of the first and the second access element is above a predetermined first threshold value and the probability of use of the first access element is higher than the probability of use of the second access element by a predetermined third threshold value, is preferably performed as an alternative to adjusting both access elements from the closed position to the open position under the condition described above that the probability of use of the first and the second access element is above a predetermined first threshold value and an absolute value of a difference in the probability of use of the first and the second access element is below a predetermined second threshold value. Thus, an unwanted opening of both access elements can be avoided from the outset.

In a further advantageous embodiment of the method it is provided that the first access element is adjusted into its closed position if the first access element has already been adjusted into its open position and the second probability of use of the first access element is now below a predetermined fourth threshold value. Alternatively or additionally it is provided in the method that the second access element is adjusted into its closed position if the second access element has already been adjusted into its open position and the second probability of use of the second access element is now below a predetermined fifth threshold value. For this method, for example, the first and second probabilities of use of the respective access elements are taken into account. For example, in response to the first probabilities of use one or both access elements were opened. However, the second probability of use now shows that for one or both access elements that the probability of use is so low that the open position is no longer sensible. The open access element no longer offers a gain in comfort, but rather can cause irritation or even encourage the user to close it manually. This can be avoided by the described configuration of the method. The fourth and/or the fifth threshold value can, for example, correspond to the first threshold value in order to implement a simple and uniform control. The fourth and/or fifth threshold value can also differ from the first threshold value, for example, to implement hysteresis when opening and closing and to avoid undesired high-frequency adjustment of the respective access elements. The fourth and fifth threshold value also allow implementing different locking conditions for different access elements. For example, a driver's door can only be locked again with a lower probability of use than a trunk lid or a back door, since the driver's door in general is more likely to be used and/or its locking is more likely to lead to a loss of comfort. This also allows to use the same calculation algorithm for all access elements and still implement an adapted adjustment to the closed position. This makes the calculation of the probabilities of use for the different access elements particularly easy.

The adjustment to the closed position and/or open position can also correspond to a respective signal, especially to an adjustment device. For example, a door can be closed again by a closing signal even before the door has been opened completely, or even before an opening signal from the adjusting device has led to an actuator movement at all.

In a further advantageous embodiment of the method it is provided that the second access element is moved to its closed position if the first access element has been manually moved to its closed position by the user. Manual closing can be achieved, for example, by pulling on an inside door handle. The manual closing of the first access element can be interpreted as a signal that the user has entered the interior or respectively used the corresponding access. Accordingly, the open second access is no longer needed and can be closed. An uncomfortable manual closing of the unused access element can thus be avoided.

In a further advantageous embodiment of the method it is provided that both access elements are adjusted into the closed position depending on a trigger signal. The trigger signal can be a starting of an engine of the motor vehicle, an opening of an access element other than one of the two access elements, a vehicle speed above a predetermined minimum speed and/or an actuation of a locking of the motor vehicle. When the engine has been started, the access elements should be locked to prevent damage caused by a driving movement. This also reliably prevents a user from getting into a vehicle that could start at any time. In this way potentially dangerous situations can be avoided. The same applies to the consideration of exceeding a minimum speed. Taking into account the actuation of the locking of the vehicle as a trigger signal makes it possible to manually suppress the automatic opening—for example, if the access element is still adjusted at the time of actuation—and/or to manually trigger a return to the closed position. In this way, for example, a person already in the vehicle can prevent another user from unintentionally entering the vehicle. The opening of another access element can be a very reliable indication that the open position of both access elements is undesirable and that further keeping them open would be detrimental to comfort, so that its consideration is also useful.

In a further advantageous embodiment of the method it is provided that the first access element and/or the second access element will be adjusted to its closed position if the detected position of the key element carried by the user is now in an interior of the motor vehicle. The interior may be a space bounded by a vehicle body and respective access elements. Preferably, the interior is a passenger compartment. When the key element is in the interior, an open access element is usually no longer needed, especially not two open access elements. Uncomfortable manual closing can thus be avoided.

In a further advantageous embodiment of the method it is provided that the first access element or the second access element is adjusted into its closed position if the first and the second access element has already been adjusted into its open position and an absolute value of a difference in the second probability of use of the first and the second access element is above a predetermined sixth threshold value, wherein the one of the access elements which has the smaller second probability of use is adjusted into the closed position. This relates to the case where a later calculation of the probabilities of use compared to a previous calculation of the probabilities of use has shown that the difference in the two probabilities of use is no longer negligible, but is so significant that closing the access element with the lower probability of use represents a comfort gain. The sixth threshold value can correspond to the second threshold value in order to implement a simple control. However, the sixth threshold value can also be unequal to the second threshold value in order to implement hysteresis when opening and closing and to avoid undesired high-frequency adjustment of the respective access elements.

In a further advantageous embodiment of the method it is provided that a stored user behavior is taken into account when calculating the probabilities of use. Thus, the prognosis is, for example, also dependent on a stored user behavior. This user behavior can, for example, relate to the frequency of use of certain access elements and/or be assigned to respective users and/or certain key elements. For example, a stored user behavior can indicate that a certain user gets in almost exclusively at the driver's door and another user with another key element usually at the passenger door. This can be taken into account to improve the calculation of probabilities of use. For example, the user behavior can be stored in a database device. In particular, previous probabilities of use and which access element was actually used can be stored as user behavior. Thus, a self-learning system and/or method can be implemented. The user behavior can, for example, comprise or respectively store detected positions and then actually used access elements. A correlation can then also be determined which is taken into account for the calculation of the probabilities of use.

In a further advantageous embodiment of the method it is provided that a surrounding of the motor vehicle, in particular obstacles such as walls and/or other motor vehicles, is taken into account in the calculation of the probabilities of use. The surrounding can be detected with respective sensors, for example an ultrasonic sensor and/or a camera. The obstacles can also be detected by respective propagation of radio waves between respective key elements and the detection device. Thus, respective boundary conditions, which limit a movement of the carrier of the key element, can be considered in the calculation of the probabilities of use. Thus, the prognosis is more accurate, especially in combination with the consideration of the above described detection of several consecutive positions. For example, the calculation can take into account that the user essentially walks the shortest way to the driver's door and, for example, only had to avoid a pillar. This evasion is then not an indication or only a weak indication of a higher probability of the user wanting to use a back door instead of a front door.

A second aspect of the invention relates to an access control system for a motor vehicle. The access control system according to the second aspect may be adapted to be operated and/or controlled by a method according to the first aspect. The features and advantages resulting from the method according to the first aspect are described in the description for the first aspect, where advantageous embodiments of the first aspect are considered to be advantageous embodiments of the second aspect and vice versa.

The access control system may comprise an adjustment device for automatically adjusting at least a first and a second access element of the motor vehicle, such as a first door and a second door, between their respective open positions and respective closed positions. To this end, the adjustment device may include respective actuators and/or control units. In particular, the adjustment device may be configured to be operatively connected to the access elements for adjusting them, in particular by articulating the access elements for moving them. In addition, the adjustment device can also be configured to unlock and/or lock the respective access elements. In particular, the adjustment device may be configured to lock and/or unlock respective door locks.

The access control system may comprise at least one portable key element. This can provide remote control and/or automatic adjustment of respective access elements, which can make access to the vehicle particularly convenient for respective users. The access control system may also include the motor vehicle and/or be partially mounted with its components on the motor vehicle. There may also be more than one key element, which, for example, belong to the access control system and/or are assigned to individual users. The key elements may be distinguishable from each other, in particular by radio and/or a specific key identifier.

The access control system may comprise at least one detection device configured to detect at least one position of the key element relative to the motor vehicle by radio. Automatic adjustment of respective access elements can be achieved with the position detection without the user having to press anything, such as a button on the key element. The detection by radio is simple, reliable and allows a position determination without direct contact of the key element with the vehicle and/or a line of sight between the vehicle and the key element. Thus, comfort is also particularly high.

The access control system may comprise at least one prediction device which is configured to calculate a probability of use for each access element depending on the at least one detected position of the key element. For this purpose, the prediction device can receive respective data from the detection device. On the basis of the probability of use, a suitable adjustment of the respective access elements can be made in order to increase the comfort for the user of the motor vehicle. By means of the prognosis a selection of an access element can be made, which is then opened automatically for the user in anticipation. In particular, the respective access elements can be adjusted early enough so that they are already sufficiently opened for access to the vehicle before the user reaches the corresponding access opening or access element. This avoids the user having to wait for an automatic unblocking of the access to the vehicle. The carrier of the key element may be a user of the access control system or a person using access to the motor vehicle.

The adjustment device may be configured to adjust both the first and second access elements from the closed position to the open position if the probability of use of the first and second access elements is above a predetermined first threshold value and an absolute value of a difference in the probability of use of the first and second access elements is below a predetermined second threshold value. Thus, inherent uncertainties in the calculation of the probabilities of use can be compensated to avoid a loss of comfort by not opening the desired access element. In particular, a manual opening of the desired access element can be avoided. The additional, possibly not needed access element causes no or at most a small loss of comfort, especially if an automatic adjustment to the closed position is also provided.

The adjustment device is preferably located or respectively installed in the motor vehicle. The detection device may preferably be at least partially installed in the motor vehicle. The detection device can be configured to distinguish between a plurality of key elements and to determine or calculate their position relative to the motor vehicle individually. A respective position calculation can also be performed by the respective key elements and/or a central server. The prediction device can be implemented in the vehicle, in the respective key element and/or on a central server.

In further advantageous embodiment of the access control system it is provided that the key element is configured as a radio key, smartphone, smartwatch, key card, RFID chip and/or remote control. In particular, a smartphone and a smartwatch are advantageous as a key element, as most people already own and carry such a device permanently with them. Thus, an additional device is not necessary. Moreover, such devices often already have the necessary radio technology to determine the position by means of the detection device. Furthermore, such devices often already have the computing power to implement parts of the access control system, such as the prediction device, on it. Thus, no separate computing power needs to be provided, which makes the access control system particularly cost effective.

Advantageously, the detection device can comprise one or more transmitters and the key element can have respective corresponding receivers. Alternatively or additionally the detection device may have one or more receivers and the key element may have respective corresponding transmitters. If the transmitter is provided in the detection device or on the motor vehicle, the key element can be particularly simple and inexpensive. If the transmitter is provided in the key element, the vehicle or detection device can be inexpensive, especially when using the smartphone and/or the smartwatch as a key element. If both transmitters and receivers are provided to the vehicle or detection device, the system can work flexibly with a wide variety of key elements. If transmitters and receivers are provided on the key element and on the detection device or the vehicle, data can be exchanged, for example for authentication and/or unique identification of the respective key element. The multiple transmitters or receivers allow easy triangulation of position. In particular, correspondingly can mean in the present context that the respective transmitters and receivers are configured to use the same radio frequency and/or the same radio standard.

The use of different signals can also be provided. For example, a signal with low energy consumption can be transmitted continuously or quasi-continuously to wake up a corresponding receiver/transmitter. Thus, another transmitter/receiver can be activated on reception, whose signal allows a better position determination, but has, for example, a higher energy consumption. Respective radio signals can be used by the detection device to triangulate the position of the key element to the respective transmitter/receiver of the detection device.

In a further advantageous embodiment of the access control system it is provided that the access control system has a comparator device. The comparator device can be a computer or microprocessor and/or be integrated in the prognosis device. The comparator device can be configured to compare the respective probabilities of use with respective threshold values in order to determine whether the respective probability of use is above or below this threshold value. Alternatively or additionally, the comparator can be configured to compute respective absolute values of differences in probabilities of use. Alternatively or additionally, the comparator device can be configured to determine which probability of use is higher of two probabilities of use.

A further aspect of the invention relates to a motor vehicle having at least a first and a second access element, such as a first door and a second door, each automatically adjustable between a closed position and an open position, and preferably all parts of the access control system are not implemented in the key element and/or on a central server. Preferably, the motor vehicle comprises the detection device, the adjustment device, the prediction device and/or the comparator device. Access control to the motor vehicle according to the further aspect can preferably be controlled by means of the method according to the first aspect. The features and advantages resulting from the method according to the first aspect and the system according to the second aspect are to be taken from the descriptions of the first and second aspect, respectively, wherein advantageous embodiments of the first and second aspect are considered to be advantageous embodiments of the further aspect and vice versa.

Further features of the invention are derived from the claims, the embodiments and from the drawings. The features and combinations of features mentioned above in the description as well as the features and combinations of features mentioned below in the exemplary embodiments can be used not only in the combination indicated in each case, but also in other combinations without leaving the scope of the invention.

SHORT DESCRIPTION OF THE FIGURES

DETAILED DESCRIPTION OF EMBODIMENTS

Figure 1:
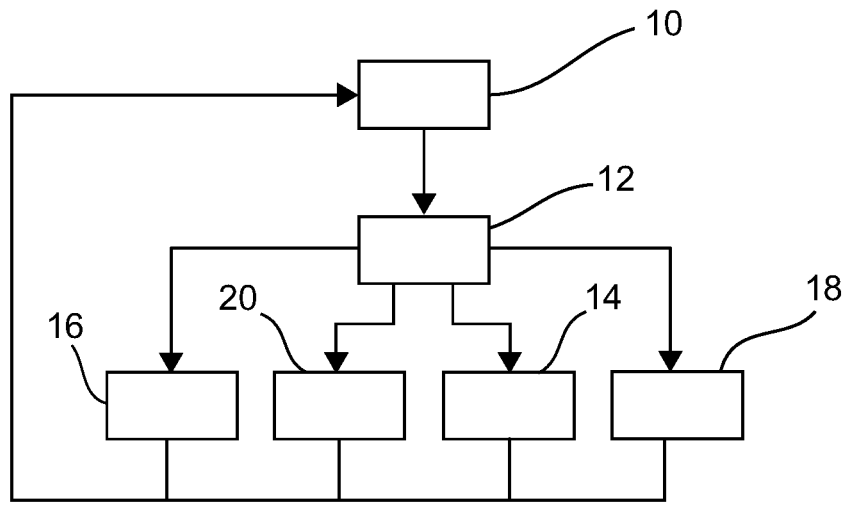
FIG. 1 illustrates, in a flow chart, a method for access control for a motor vehicle.

FIG. 1 illustrates, in a flow chart, a method for access control for a motor vehicle. With the method, access to the motor vehicle with at least a first and a second access element of the motor vehicle, each of which can be automatically adjusted between a closed position and an open position, can be controlled.

The method starts with step 10, in which at least one position of a key element carried by a user is detected relative to the motor vehicle by radio. In the following step 12, the probability of use of each access element is calculated depending on the at least one detected position of the key element. If this calculation yields a sufficiently high probability of use for only one access element, in particular because its probability of use is the only one above a predetermined first threshold value, this access element is moved to its open position in step 14.

If the calculation results in a sufficiently high probability of use for at least two of the access elements because the probability of use for both access elements is above the first predetermined threshold value, a difference of the two probabilities of use is calculated. If an absolute value of this difference is below a predetermined second threshold value, both access elements are adjusted into the open position in step 16. The second threshold value can be a significance threshold below which it is no longer possible to distinguish with sufficient certainty which access element should be opened exclusively.

If an absolute value of this difference is above a predetermined third threshold value, the one of the two access elements that has the higher probability of use is adjusted to the open position in step 18. In this case, the opening of both access elements would make sense on its own, but the probability of use for one of the two access elements is so significantly higher that only its opening is sufficient to allow comfortable access to the vehicle. Thus, unnecessary adjustment of an access element and/or an unnecessarily open access element can be avoided.

This procedure can be repeated, wherein the position of the key element is detected again in step 10 and an updated second prediction, following to the first, with calculation of updated second probabilities of use is made in step 12. If the calculation results in a different situation according to steps 14, 16 and 18, respective access elements can be adjusted back into their closed position. For example, according to step 16, a first prognosis may show that both access elements have to be adjusted into the open position due to an insufficient difference in the probabilities of use but sufficient probabilities of use by themselves. For example, a second prognosis can show that only a certain one of these two access elements would have to be adjusted into the open position because the difference of the probabilities of use is now sufficiently large. This would correspond to step 18 described above. However, if both access elements are already in the open position in the case of the second prediction, the access element with the lower probability of use is closed again in step 18.

Likewise, in response to a second calculation of the probabilities of use or a second prediction, the first access element can be adjusted into its closed position if the first access element has already been adjusted into its open position and the second probability of use of the first access element is now below a predetermined fourth threshold value. Similarly and alternatively or additionally, the second access element can be adjusted into its closed position if the second access element has already been adjusted into its open position and the second probability of use of the second access element is now below a predetermined fifth threshold value. Such an adjustment can be performed in step 20. This respective adjustment back from the open position to the closed position can also be called readjustment. Due to the readjustment, respective access elements can be automatically closed again, thus avoiding uncomfortable situations for the user due to incorrect usage prognoses of access elements.

The method can be terminated if, for example, the user or carrier of the key element uses an access and has entered the vehicle. The method can be terminated, for example, if the position of the key element is detected and it shows that the key element has moved through an access element into the interior of the motor vehicle. In this case, all access elements in the open position can then be closed automatically, preferably after a predetermined delay. The method can also be terminated by a trigger signal. Such a trigger signal can be, for example, the starting of a drive or engine of the motor vehicle, a drive off with the motor vehicle, a manual operation of a lock and/or a detected movement of the key element through another access element into the interior of the motor vehicle. The triggering signal may also cause all access elements to close.

Figure 2:
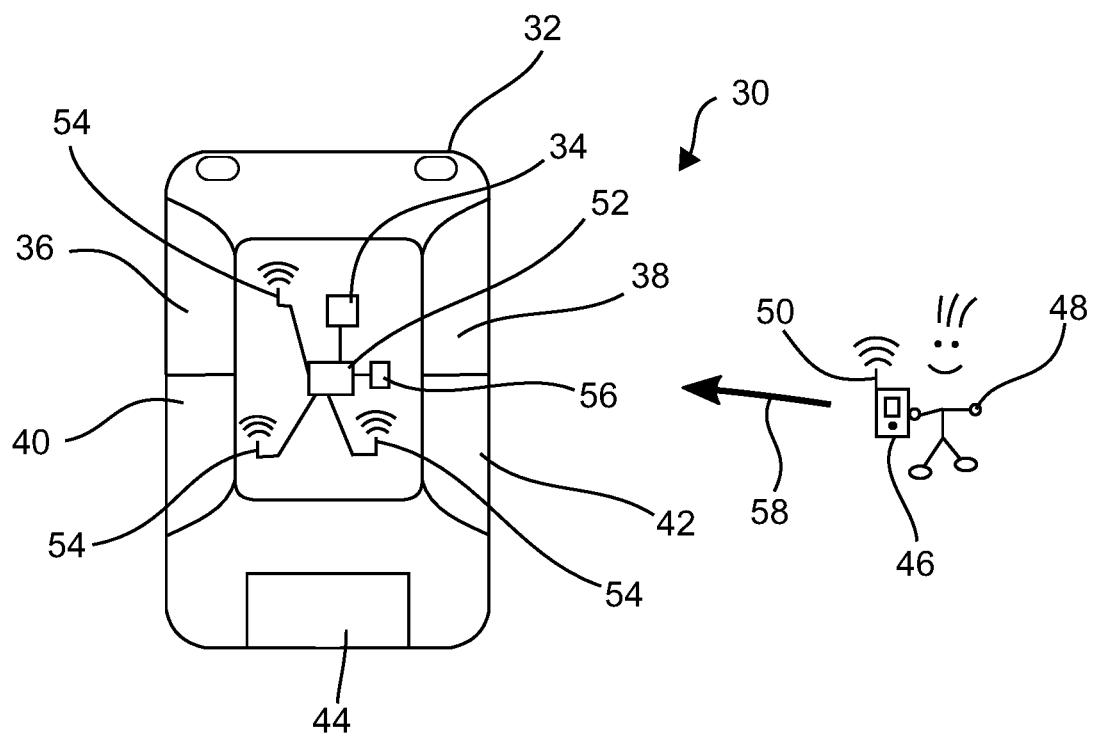
FIG. 2 shows, in a schematic view, an access control system for a motor vehicle.

FIG. 2 shows, in a schematic view, an access control system 30 for a motor vehicle 32. The access control system 30 comprises an adjustment device 34 for the automatic adjustment of a plurality of access elements of the motor vehicle. Presently, the access elements are configured as the two front doors 36 and 38 or driver's door 36 and passenger door 38, as well as the rear doors 40 and 42 and the trunk lid 44. Each of these doors is operatively connected to the adjustment device 34 for opening and closing. Thus, the respective access elements of the motor vehicle 32 can be opened and closed automatically. The operative connection is not shown further in the present case and can, for example, be made by means of respective actuators.

The access control system 30 comprises one or more portable key elements. A smartphone 46 is shown as a key element, which is carried by a user 48. The smartphone 46 has an antenna 50, which allows the transmission and/or reception of radio signals.

The access control system 30 also comprises a detection device 52, which is configured to detect at least one position of the smartphone 46 relative to the vehicle 32 by radio. For this purpose, the detection device 52 presently comprises three antennas 54, which are arranged at a distance from each other on the vehicle 32 and allow triangulation of the smartphone 46. Alternatively or additionally, for detecting the position relative to the vehicle 32 respective sensor data captured by the smartphone 46 could be used. For example, the smartphone 46 could use acceleration sensors, position sensors and/or GPS to detect or calculate its position and/or movement and transmit this data by radio to the detection device 52.

The access control system 30 also comprises a prediction device 56, which is configured to calculate an assigned probability of use for each of the access elements 36, 38, 40, 42, and 44 depending on the at least one detected position of the smartphone 46. A first calculation can be made, for example, if the smartphone 46 or the user 48 is closer to the motor vehicle than a predetermined minimum distance.

The adjustment device 34, for example, is basically configured to adjust the one of the plurality of access elements 36, 38, 40, 42, and 44 for which the highest probability of use has been calculated from its closed position to its open position, provided that this probability of use is above the first threshold value. However, there may be cases in which the respective calculated probabilities of use do not result in an unambiguous prognosis of the door that the user will use. For example, in this case, user 48 may approach a transition between passenger door 38 and rear door 42 in a straight line, as illustrated by arrow 58. This may result in a value for the probability of use of the passenger door 38 that is identical to or very close to the probability of use of the rear door 42. Both probabilities of use can be above the first threshold value. In this case, both the passenger door 38 and the rear door 42 are automatically adjusted to their open position, which corresponds to the adjustment in step 16. Therefore, the user 48 may comfortably enter vehicle 32 without having to open the door manually, regardless of whether he uses the rear or front access.

As can be seen from the description of the access control system 30, it is suitable or configured to carry out the method illustrated in FIG. 1 or to be operated using this method.

The invention claimed is:

1. A method for access control of a motor vehicle, wherein the motor vehicle comprises a first and a second access element, wherein each is automatically adjusted between a closed position and an open position and configured as a door, the method comprising:
    detecting, by radio and a detection device, at least one position of a key element carried by a user relative to the motor vehicle;
    calculating, by a prediction device, a probability of use for each of the first and second access element based on the at least one detected position of the key element with the prediction device;
    determining that:
        the probability of use of each of the first and second access element is above a predetermined first threshold value; and
        an absolute value of a difference in the probability of use of the first and second access element is below a predetermined second threshold value; and
    in response to the determining, adjusting, by an adjustment device, each of the first and second access element from the closed position to the open position with the adjustment device.

2. The method according to claim 1, wherein a plurality of consecutive positions of the key element are detected and the plurality of consecutive positions of the key element are taken into account in the calculation of the probability of use for each of the first and second access element.

3. The method according to claim 1, wherein, for each of the first and second access element, a first probability of use and at least one subsequent second probability of use is calculated.

4. The method according to claim 3, wherein:
    the first access element is adjusted into the closed position if:
        the first access element is in the open position; and
        the second probability of use of the first access element is below a predetermined fourth threshold; or
    the second access element is adjusted into its closed position if:
        the second access element is in the open position; and
        the second probability of use of the second access element is below a predetermined fifth threshold value.

5. The method according to claim 3, wherein at least one of the first access element or the second access element is adjusted into its closed position if previously having been adjusted in the open position and if:
  the first and second access elements are in open positions; and
  an absolute value of a difference in the second probability of use of the first and second access element is above a predetermined sixth threshold value;
  wherein at least one of the first access element or the second access element to be adjusted into the closed position has a smaller second probability of use than the probability of use of the other one of the first access element or the second access element.

6. The method according to claim 1, wherein the first access element is adjusted from its closed position to the open position and the second access element remains in the closed position instead of adjusting each of the first and second access element from the closed position to the open position if:
  the probability of use of each of the first and second access elements is above the predetermined first threshold; and
  the probability of use of the first access element is higher than the probability of use of the second access element by a predetermined third threshold value.

7. The method according to claim 1, wherein the second access element is adjusted into the closed position if the first access element has been manually adjusted into its closed position by the user.

8. The method according to claim 1, wherein each of the first and second access element are adjusted into the closed position based on a trigger signal if previously having been adjusted in the open position, the trigger signal comprising at least one of:
  a starting of an engine of the motor vehicle;
  an opening of an access element other than one of the first and second access element;
  a motor vehicle speed above a predetermined minimum speed; or
  an actuation of a lock of the motor vehicle.

9. The method according to claim 1, wherein at least one of the first access element and the second access element is adjusted into the closed position if previously having been adjusted in the open position when the detected position of the key element carried by the user is located in an interior of the motor vehicle.

10. The method according to claim 1, wherein a stored user behavior is taken into account when calculating the probability of use for each of the first and second access element.

11. The method according to claim 1, wherein a surrounding of the motor vehicle comprising at least one of walls or other motor vehicles is taken into account in the calculation of the probability of use for each of the first and second access element.

12. An access control system for a motor vehicle comprising:
  an adjustment device for automatically adjusting at least a first and a second access element of the motor vehicle comprising a first door and a second door between their respective open position and respective closed position;
  at least one portable key element;
  a detection device configured to detect at least one position of the key element relative to the motor vehicle by radio; and
  a prediction device configured to calculate a probability of use for each of the first and second access element based on the at least one detected position of the key element,
  wherein the adjustment device is configured to adjust each of the first and second access element from the closed position to the open position if:
    the probability of use of each of the first and second access elements is above a predetermined first threshold value; and
    an absolute value of a difference in the probability of use of the first and second access element is below a predetermined second threshold value.

13. The access control system according to claim 12, wherein the key element is configured as at least one of a radio key, smartphone, smartwatch, key card, RFID chip or remote control.

14. The access control system according to claim 12 comprising a comparator device configured to:
  compare the probability of use of each of the first access element and the second access element with the respective threshold values to determine whether a respective probability of use of each of the first access element and the second access element is above or below the respective threshold values;
  calculate respective absolute values of differences in the probability of use of each of the first access element and the second access element and their respective threshold values; and
  determine which of the probability of use of each of the first access element and the second access element is higher.

* * * * *